US006159391A

United States Patent [19]

Kobayashi et al.

[11] Patent Number: 6,159,391

[45] Date of Patent: Dec. 12, 2000

[54] BLEACHING AGENT COMPOSITIONS

[75] Inventors: Tsuneo Kobayashi; Masahito Mikami; Rumi Takano, all of Kanagawa; Yasuhisa Kuriyama, Ibaraki; Jun Kokubu, Mie; Yasuo Hiro, Mie; Yoshiko Tsuji, Mie, all of Japan

[73] Assignee: S. C. Johnson & Son, Inc., Racine, Wis.

[21] Appl. No.: 09/242,685

[22] PCT Filed: Aug. 15, 1997

[86] PCT No.: PCT/JP97/02837

§ 371 Date: Dec. 27, 1999

§ 102(e) Date: Dec. 27, 1999

[87] PCT Pub. No.: WO98/07815

PCT Pub. Date: Feb. 26, 1998

[30] Foreign Application Priority Data

Aug. 20, 1996 [JP] Japan .................................... 8-218739

[51] Int. Cl.[7] .............................. C09K 3/00; C11D 3/39; C11D 7/18; C11D 7/38

[52] U.S. Cl. ............................... 252/186.38; 252/186.39; 510/312; 510/313

[58] Field of Search ......................... 252/186.38, 186.39; 510/312, 313

[56] References Cited

U.S. PATENT DOCUMENTS

| | | | |
|---|---|---|---|
| 3,882,035 | 5/1975 | Loffelman et al. | 8/111 |
| 4,025,453 | 5/1977 | Kravetz et al. | 427/221 |
| 4,199,466 | 4/1980 | Benson, Jr. | 8/107 |

FOREIGN PATENT DOCUMENTS

| | | |
|---|---|---|
| 0008475 | 5/1980 | European Pat. Off. . |
| 52-52880 | 4/1977 | Japan . |
| 802035 | 6/1956 | United Kingdom . |
| 9606911 | 3/1996 | WIPO . |
| 9606912 | 3/1996 | WIPO . |
| 9613634 | 5/1996 | WIPO . |
| 9700933 | 1/1997 | WIPO . |

OTHER PUBLICATIONS

Article Entitled: "Mechanism of the Tertiary Amine–Catalyzed Dicyandiamide Cure of Epoxy Resins", by Saunders et al. Maker from *Journal of Polymer Science*, Part–1, vol. 5, pp. 1609–1617 (1967).

*Primary Examiner*—Joseph D. Anthony

[57] ABSTRACT

A bleaching agent composition comprising (A) hydrogen peroxide or a peroxide which generates hydrogen peroxide in an aqueous solution, and (B) an addition reaction product of dicyandiamide and a glycidyl ether compound, wherein the pH of the mixed aqueous solution of compound (A) and components (B) becomes at least 7.5.

3 Claims, No Drawings

BLEACHING AGENT COMPOSITIONS

TECHNICAL FIELD

The present invention relates to a hydrogen peroxide bleaching agent composition having excellent bleaching power. The bleaching agent composition of the present invention is used for the purpose of cleaning, bleaching, disinfecting/sterilizing, and deodorizing, in particular, it is favorably used for removing and bleaching mildew.

BACKGROUND ART

Bleaching agents and fungicides can be divided into chlorine bleaching agents and peroxide bleaching agents. The chlorine bleaching agents containing sodium hypochlorite as their main component have been used for bleaching clothes, or bleaching mildew on the walls of a house or on furniture since they nave high bleaching power. However, though the chlorine bleaching agents have excellent bleaching power, since they discolor the clothes, they are not appropriate for bleaching dyed or patterned cloths. They also have defects that they generate a peculiar odor due to the molecular chlorine, and give unpleasant feel to the users, and that they may cause chlorine gas poisoning if they are misused.

On the other hand, peroxide bleaching agents have a broader range of use application as a bleaching agent than that of the chlorine bleaching agents, and have no unpleasant smell, thus the usage thereof, particularly that of the household bleaching agent has been increased. But, peroxides alone have poorer bleaching power in comparison with the chlorine bleaching agents, and the bleaching power thereof is not sufficient for bleaching the clothes at a low temperature, or for bleaching mildew and the like, which is attached on walls of a house or on furniture, in particular, on the bathroom walls, kitchen counter, ceiling or tile joints and the like.

Accordingly, peroxides such as hydrogen peroxide, sodium carbonate-hydrogen peroxide adduct, and sodium perborate have been conventionally used together with N-acyl compounds such as tetraacetylethylenediamine (TAED), tetraacetylglycoluryl (TAGU), and esters such as glucose pentaacetate and saccharose octaacetate, to improve the bleaching power. Various nitrile compounds have been also proposed as a bleach activating agent for improving the bleaching power of the peroxides. For example, various nitrites have been proposed as a useful bleach activating agent in United Kingdom Patent No. 802,035, iminodiacetonitrile has been proposed as a useful bleach activating agent in U.S. Pat. No. 3,882,035, and p-chlorobenzoyl cyanamide has been proposed as a useful bleach activating agent in Japanese Patent Application Laid-Open No. 52-52880.

However, even though these activating agents are used together with the peroxides, the bleaching of clothes can not be carried out sufficiently at a low temperature, and the bleaching effect on the mildew in a house has been insufficient as well. Besides, acetylamide compounds such as TAED and acetyl esters such as glucose pentaacetate have a drawback that they react with hydrogen peroxide to generate peracetic acid and produce a peculiar odor.

DISCLOSURE OF INVENTION

An object of the present invention is to provide a bleaching agent composition which has an excellent effect in bleaching clothes and the like, exercises excellent bleaching power to the mildew generated on walls of a house or on furniture, and which does not have an odor.

As a result of their intensive study on the above-mentioned problems, the present inventors found that a bleaching agent composition comprising (A) hydrogen peroxide or a peroxide which generates hydrogen peroxide in an aqueous solution, and (B) an addition reaction product of dicyandiamide and a glycidyl ether compound, wherein the pH value of the mixed aqueous solution of the component (A) and the component (B) becomes at least 7.5, has a very high activity in the bleaching of clothes and the bleaching of mildew grown on the walls of a house and the like, and has no irritating smell, and completed the present invention.

DESCRIPTION OF PREFERRED EMBODIMENTS

As hydrogen peroxide or a peroxide to generate hydrogen peroxide, a commercially available hydrogen peroxide aqueous solution, sodium carbonate-hydrogen peroxide adduct in which the sodium carbonate and hydrogen peroxide are added at the molar ratio of 2:3, sodium perborate hydrate, sodium perborate tetrahydrate and the like are used.

On the other hand, the addition reaction product of the dicyandiamide and the glycidyl ether compound is an addition reaction product of the dicyandiamide represented by the following formula (1) and a glycidyl ether compound represented by the formula (2) for monoglycidyl ether or the formula (3) for polyglycidyl ether.

(1)

$$H_2N—C(=NH)NH—C \equiv N$$

(2)

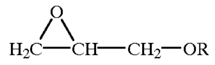

(3)

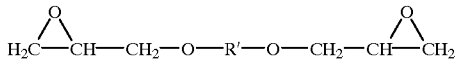

In the above-mentioned formula (2), R represents H, or an alkyl or aryl group having 1 to 10 carbon atoms (examples thereof include methyl, butyl, phenyl and the like), phenol polyethylene glycol residue, or a residue of a polyvalent alcohol such as glycerin, trimethylolpropane, ethylene glycol, polyethylene glycol (the number of moles of added EO, n=2 to 15), propylene glycol, polypropylene glycol (the number of moles of added PO, n=2 to 15). Examples include glycidol (when R=H), methyl glycidyl ether, butyl glycidyl ether, phenyl glycidyl ether, phenol ethylene glycol (the number of moles of EO, n=1 to 10) and the like, or a residue of glycerin, trimethylol propane, ethylene glycol, polyethylene glycol (the number of moles of EO, n=2 to 15), propylene glycol, polypropylene glycol (the number of moles of PO, n=2 to 15) and the like.

In the above-mentioned formula (3), examples of R' include a residue of glycerin, trimethylol propane, ethylene glycol, polyethylene glycol (the number of moles of EO, n=2 to 15), propylene glycol, polypropylene glycol (the number of moles of PO, n=2 to 15), phenol ethylene oxide adduct (the number of moles of EO, n=1 to 10) and the like, and these compounds are commercially available and can be easily obtained. Examples thereof include neopentyl glycol diglycidyl ether, ethylene glycol diglycidyl ether, trimethyl propane triglycidyl ether and the like. The solubility of the glycidyl ether compound used for the reaction is desirably at least 5% to water at 25° C.

The addition reaction process of the above-mentioned dicyandiamide with the alkyl glycidyl ether compound is generally known, and an example thereof has been described in Journal of Polymer Science, Part-1,5,1609 ('67), in which phenyl glycidyl ether and dicyandiamide are subjected to reaction in the presence of a tertiary amine (N,N-dimethyl benzyl amine) at 85° C. to 96° C. for 2.3 hours.

The above-mentioned component (A) and the component (B) are used in the form of a mixed aqueous solution, the pH of which is at least 7.5. For producing a mixed aqueous solution having the pH of at least 7.5, generally a hydroxide of an alkali metal such as caustic soda and caustic potash, or an alkali agent such as sodium orthosilicate is used, however, an acid such as hydrochloric acid can be also used for controlling the pH depending on the situation. Examples of an alkali agent include, in addition to the above-mentioned alkali metal hydroxide, known alkali builders such as an aminocarboxylic acid type builder, oxycarboxylic acid type builder, phosphonic acid type builder, a polymeric type builder such as acrylate-vinylsulfonate, phosphate builder, silicate builder, borate builder, and carbonate builder, but among them, a silicate builder is preferable.

To use the bleaching agent composition of the present invention, the component (A): hydrogen peroxide or a peroxide which generates hydrogen peroxide, and the component (B): an addition reaction product of dicyandiamide and a glycidyl ether compound, and if necessary, the third component (C): an alkali agent or an alkali builder are dusted on the object to be bleached or these are used together with a detergent during washing. However, the above-mentioned components (A), (B) and if necessary (C) are preferably made into a mixed aqueous solution previously in order to carry out the bleaching process easily. The content of hydrogen peroxide in such a case is 0.5 to 60% by weight, preferably 0.5 to 10% by weight, more preferably 1 to 6% by weight. The content below this range results in weak bleaching power, and the content over this range makes the handling difficult. The content of the addition reaction product of the dicyandiamide and the glycidyl ether compound is 0.2 to 30% by weight, preferably 0.5 to 10% by weight, more preferably 0.5 to 5% by weight. An alkali agent or an alkali builder is blended therewith if necessary so that the pH of the resulting mixed aqueous solution becomes at least 7.5, preferably in the range of from 9 to 13. Those components can be prepared separately or in combination, and dissolved in water immediately before the use to provide the aqueous solution or slurry.

The bleaching agent composition of the present invention can be mixed with a known detergent; or bleaching agent constituent such as a surfactant, an organic or inorganic builder, hydrotrope agent, solvent, perfume, abrasive agent, and a stabilizer for hydrogen peroxide, if necessary. It can also be used together with dicyandiamide, cyanourea, a dicyanoamine salt, a cyanamide salt and the like, if necessary. In order to increase the viscosity of the bleaching agent composition and reduce the dripping of the liquid when it is coated on a ceiling, or a vertical or inclined surface, a thickening agent including a synthesized or semisynthetic polymer such as an acrylic acid derivative polymer and a cellulose derivative, a natural polymer such as xanthan gum, guar gum, and an inorganic type thickening agent such as alumina sol can be added as well.

To further illustrate the present invention, the following Examples and Comparative Examples are given, provided that the present invention is not limited by the following Examples.

The bleaching agent compositions obtained in the Examples and Comparative Examples were evaluated by the following test methods.

1. Bleaching test method and evaluation method

1) Standard soiled cloth

For the bleaching test, EMPA #115 soiled cloth for bleaching test was used. The EMPA soiled cloth was cut into pieces of 10 cm×10 cm and subjected to the bleaching test.

2) Bleaching test method 20 g of a bleaching agent composition was put into a beaker and one piece of EMPA soiled cloth was immersed therein and allowed to stand for 10 minutes. Then the soiled cloth was taken out and rinsed with tap water thoroughly and dried.

3) Evaluation method

The test cloth treated according to the above-mentioned process was classified into four levels according to the following criteria by visual examination.

Bleaching degree IV: Almost completely bleached.

Bleaching degree III: Bleached to some extent.

Bleaching degree II: Scarcely bleached.

Bleaching degree I: Not at all bleached.

2. Mildew stain removal test method and evaluation method

1) Mildew culturing process

An agar culture medium was sterilized by steam and put in a sterilized Petri dish, and black mildew (Aureobasidium pullulans: IFO6353, IAM F-24) was transplanted on the agar medium and cultured in an incubator at 28° C. for 30 days.

2) Mildew stain removal test method

A glass tube of a fixed length was inserted into the agar medium on which the black mildew was grown and bleaching agent composition was poured into the glass tube and allowed to stand for 30 minutes, then the degree of the mildew stain removed was evaluated.

3) Evaluation method

The mildew surface treated according to the above-mentioned process was classified into four levels according to the following criteria by visual examination.

Mildew stain removal degree IV: Almost completely removed.

Mildew stain removal degree III: Removed to some extent.

Mildew stain removal degree II: Scarcely removed.

Mildew stain removal degree I: Not at all removed.

EXAMPLE 1

To 3.0 g ($3.57\times10^{-2}$ mol) of dicyandiamide, was added 15 g ($8.67\times10^{-2}$ mol) of ethylene glycol diglycidyl ether (DENACOL EX-810, produced by NAGASE CHEMICALS LTD.), then 0.27 g of N-methyl morpholine was added thereto and subjected to reaction at 60 to 70° C. for 1 hour. The dicyandiamide was allowed to react, dissolved and the solution became transparent. The obtained transparent reaction solution was used for the test without carrying out any further treatment.

EXAMPLE 2

To 2.5 g ($3\times10^{-2}$ mol) of dicyandiamide, was added 5.4 g ($1.5\times10^{-2}$ mol) of polyethylene glycol diglycidyl ether (EO, n=9) (DENACOL EX-830, produced by NAGASE CHEMICALS LTD.), then 0.2 g of N-methyl morpholine was added thereto and subjected to reaction at 60 to 70° C. for 1.5 hours. 5.0 g of benzyloxyethanol was added thereto and the viscosity of the solution was controlled. The reaction was further continued at 60 to 70° C. for 30 minutes, and the dicyandiamide was allowed to react, dissolved and the solution became transparent. The obtained transparent reaction solution was used for the test without carrying out any further treatment.

EXAMPLE 3

To 2 g ($2.38\times10^{-2}$ mol) of dicyandiamide, was added 8.81 g ($2.38\times10^{-2}$ mol) of phenol polyethylene glycol (EO, n=5) diglycidyl ether (DENACOL EX-145, produced by NAGASE CHEMICALS LTD.), then 0.1 g of N-methyl morpholine was added thereto and subjected to reaction at 60 to 70° C. for 3 hours. The dicyandiamide was allowed to react, dissolved and the solution became transparent. The obtained transparent reaction solution was used for the test.

EXAMPLE 4

To 4.2 g ($5.0\times10^{-2}$ mol) of dicyandiamide, was added 3.7 g ($5.0\times10^{-2}$ mol) of glycidol (EPIOL OH, produced by NIPPON OIL FATS CO. LTD.), then 0.2 g of N-methyl morpholine and 7.3 g of benzyloxyethanol were added thereto and subjected to reaction at 70 to 80° C. for 2 hours. The dicyandiamide was allowed to react, dissolved and a transparent solution was generated. The obtained transparent solution was used for the test.

EXAMPLE 5

To 4.2 g ($5.0\times10^{-2}$ mol) of dicyandiamide, was added 4.4 g ($5.0\times10^{-2}$ mol) of methyl glycidyl ether (EPIOL M, produced by NIPPON OIL FATS CO. LTD.), then 0.2 g of tributyl amine was added thereto and subjected to reaction at 70 to 80° C. for 3 hours. The dicyandiamide was allowed to react, dissolved and a transparent solution was generated. The obtained transparent solution was used for the test.

EXAMPLE 6

To 8.4 g ($10\times10^{-2}$ mol) of dicyandiamide, was added 10.2 g ($5.0\times10^{-2}$ mol) of glycerin diglycidyl ether (DENACOL EX-313, produced by NAGASE CHEMICALS LTD.), then 0.4 g of N-methyl morpholine and 17 g of benzyloxyethanol were added thereto and 30 ml of ethanol was further added and subjected to reaction at an oil bath temperature of 90° C. for 4 hours. After the reaction, 0.8 g of toluenesulfonic acid was added and ethanol was removed under reduced pressure and the obtained transparent solution was used for the test.

EXAMPLES 7 to 12 AND COMPARATIVE EXAMPLES 1 TO 3

Mixed aqueous solutions were prepared by dissolving materials in water such that the hydrogen peroxide concentration became 1.0 to 20.0% by weight, and the concentration of the addition reaction product of the dicyandiamide and the glycidyl ether compound became 1.0 to 10.0% by weight, then the pH of the mixed aqueous solutions was controlled to pH 7.0 to 10.5 by using sodium hydroxide or sodium orthosilicate to provide bleaching agent compositions. The obtained compositions were tested for their bleaching effect and mildew stain removal effect using EMPA #115 standard soiled cloth and the mildew stain. The results are shown in Table 1 and Table 2. The content of each component is given by percent by weight in the following Tables. The content of the addition reaction product of the dicyandiamide and glycidyl ether compound is given by the concentration of the dicyandiamide.

TABLE 1

| Examples | 7 | 8 | 9 | 10 | 11 | 12 |
|---|---|---|---|---|---|---|
| Hydrogen peroxide | 6.0 | 6.0 | 6.0 | 4.0 | 6.0 | 10.0 |
| Adduct of Example 1 | 5.0 | | | | | |
| Adduct of Example 2 | | 4.0 | | | | |
| Adduct of Example 3 | | | 5.0 | | | |
| Adduct of Example 4 | | | | 5.0 | | |
| Adduct of Example 5 | | | | | 5.0 | |
| Adduct of Example 6 | | | | | | 5.0 |
| Caustic soda (pH adjustment) | | | | TA | TA | TA |
| Sodium metasilicate (pH adjustment) | TA | TA | TA | | | |
| Ion exchanged water | | | remainder | | | |
| Total | 100 | 100 | 100 | 100 | 100 | 100 |
| pH of the mixed aqueous solution | 10.4 | 10.5 | 10.5 | 10.3 | 10.0 | 10.5 |
| Bleaching test results | IV | IV | IV | IV | III | III |
| Mildew stain removal test results | IV | IV | IV | III | III | III |

Note) TA: Trace amount

TABLE 2

| Comparative Examples | 1 | 2 | 3 |
|---|---|---|---|
| Hydrogen peroxide | | 6.0 | 6.0 |
| Solution of Example 1 | 5.0 | | |
| Solution of Example 2 | | | |
| Solution of Example 3 | | | |
| Solution of Example 4 | | 5.0 | |
| Solution of Example 5 | | | |
| Solution of Example 6 | | | |
| Sodium metasilicate (pH adjustment) | TA | TA | TA |
| Ion exchanged water | | remainder | |
| Total | 100 | 100 | 100 |
| pH of the mixed aqueous solution | 10.5 | 7.0 | 10.5 |
| Bleaching test results | I | II | II |
| Mildew stain removal test results | I | I | II |

Note) TA: Trace amount

EXAMPLES 13 TO 16 AND COMPARATIVE EXAMPLES 4 TO 6

Bleaching compositions were prepared using sodium carbonate-hydrogen peroxide adduct or sodium perborate hydrate instead of hydrogen peroxide. The amount of the sodium carbonate-hydrogen peroxide adduct or sodium perborate hydrate used was represented by the amount of hydrogen peroxide contained. The obtained bleaching agent compositions were used for EMPA soiled cloth bleaching test and mildew stain removal test and the results are shown in Table 3.

TABLE 3

| Examples | 13 | 14 | 15 | 16 | | | |
|---|---|---|---|---|---|---|---|
| Comparative Examples | | | | | 4 | 5 | 6 |
| Hydrogen peroxide | | | | | 2.0 | | |
| SPC* | 5.0 | 6.0 | | | 3.0 | | 6.0 |
| PB** | | | 6.0 | 6.0 | | | |
| Solution of Example 1 | 5.0 | | | | | | |

TABLE 3-continued

| Examples | 13 | 14 | 15 | 16 | | | |
|---|---|---|---|---|---|---|---|
| Solution of Example 2 | | | 6.0 | | | | |
| Solution of Example 3 | | | | 10.0 | | | |
| Solution of Example 4 | | 5.0 | | | | | |
| Solution of Example 5 | | | | | | | |
| Solution of Example 6 | | | | | | 6.0 | |
| Sodium metasilicate | | | | | | | |
| Ion exchanged water | | | remainder | | | | |
| Total | 100 | 100 | 100 | 100 | 100 | 100 | 100 |
| pH of the mixed aqueous solution | 10.5 | 10.3 | 10.5 | 10.5 | 9.4 | 10.6 | 10.6 |
| Bleaching test results | IV | IV | IV | IV | II | I | II |
| Mildew stain removal test results | IV | IV | IV | IV | II | I | II |

*:Sodium carbonate-hydrogen peroxide adduct (the figure represents the concentration of hydrogen peroxide)
**:Sodium perborate hydrate (the figure represents the concentration of hydrogen peroxide)

Effect of Invention

The results of Table 1 to Table 3 show that all of the compositions containing both hydrogen peroxide, sodium carbonate-hydrogen peroxide adduct or sodium borate hydrate and an addition reaction product of dicyandiamide and a glycidyl ether compound, which are so prepared that the pH of the mixed aqueous solution becomes at least 7.5, show an excellent bleaching effect and mildew stain removal effect, while all of the Comparative Examples which do not contain either hydrogen peroxide, sodium carbonate-hydrogen peroxide adduct, and sodium perborate hydrate, or an addition reaction product of dicyandiamide and a glycidyl ether compound, or which contain both of them but the pH of the mixed aqueous solution is below 7.5, show no or little bleaching effect as well as mildew stain removal effect.

What is claimed is:

1. A bleaching agent composition comprising (A) hydrogen peroxide or a peroxide which generates hydrogen peroxide in an aqueous solution, and (B) an addition reaction product of dicyandiamide and a glycidyl ether compound, wherein the pH of the mixed aqueous solution of the component (A) and the component (B) becomes at least 7.5.

2. A bleaching agent composition comprising a mixed aqueous solution the pH of which is at least 7.5, containing (A) hydrogen peroxide or a peroxide which generates hydrogen peroxide in an aqueous solution, and (B) an addition reaction product of dicyandiamide and a glycidyl ether compound, wherein the content of the component (A) in terms of hydrogen peroxide is 0.5 to 60% by weight and the content of the component (B) is 0.2 to 40% by weight.

3. A bleaching agent composition comprising (A) hydrogen peroxide or a peroxide which generates hydrogen peroxide in an aqueous solution, (B) an addition reaction product of dicyandiamide and a glycidyl ether compound, and (C) an alkali agent or an alkali builder, wherein the pH of the mixed aqueous solution of the component (A), component (13) and component (C) becomes at least 7.5.

* * * * *

UNITED STATES PATENT AND TRADEMARK OFFICE
CERTIFICATE OF CORRECTION

PATENT NO. : 6,159,391
DATED : December 12, 2000
INVENTOR(S) : Tsuneo Kobayashi et al.

It is certified that error appears in the above-identified patent and that said Letters Patent is hereby corrected as shown below:

Column 1,
Line 18, replace [navel] with -- have --.
Line 47, change [nitrites have] to -- nitriles have --.

Claims,
Claim 3,
Line 6, at the beginning, replace [component (13)] with -- component (B) --.

Signed and Sealed this

Twenty-third Day of October, 2001

*Attest:*

Nicholas P. Godici

NICHOLAS P. GODICI

*Attesting Officer*

*Acting Director of the United States Patent and Trademark Office*